Nov. 14, 1939.  C. WISHER  2,180,269
ROAD CLEANING DEVICE
Filed Nov. 29, 1937  2 Sheets-Sheet 1
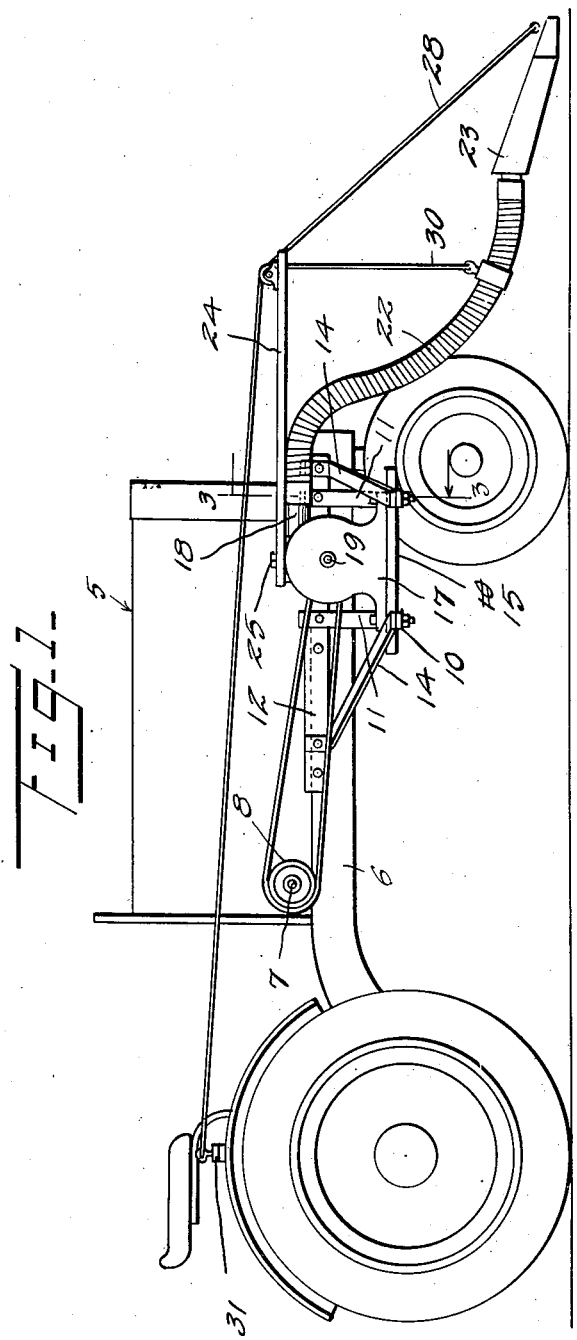
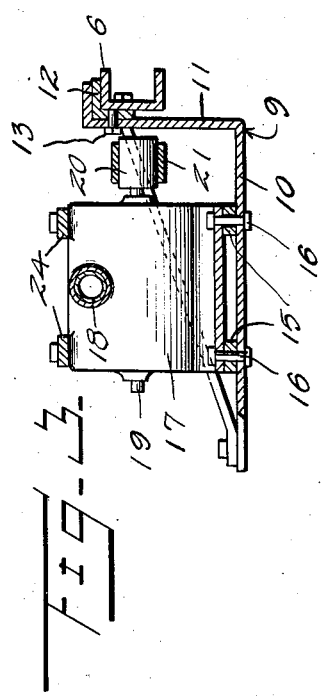
Charles Wisher
INVENTOR
BY *Victor J. Evans & Co.*
ATTORNEYS

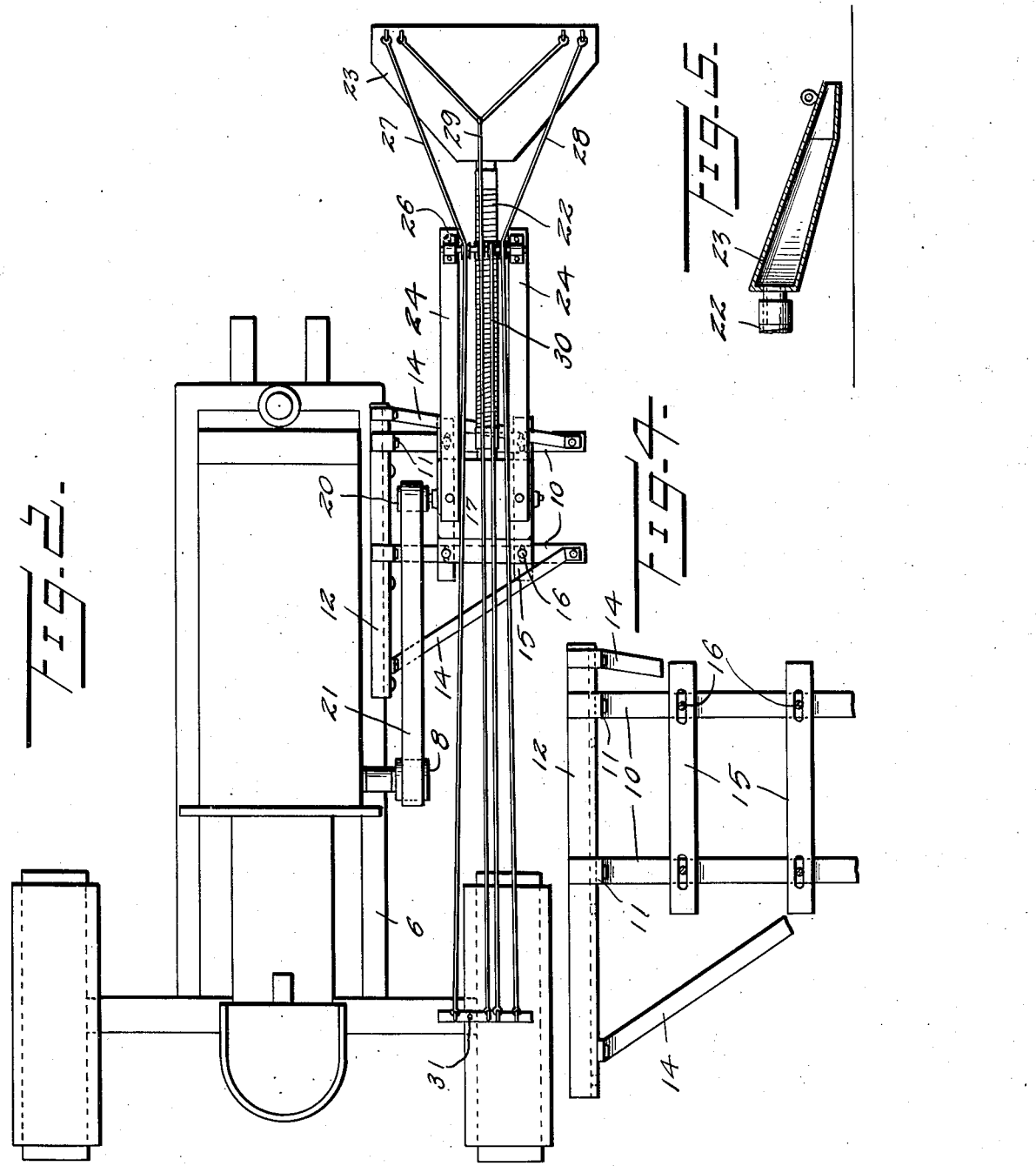

Patented Nov. 14, 1939

2,180,269

UNITED STATES PATENT OFFICE 2,180,269

ROAD CLEANING DEVICE

Charles Wisher, Spencerville, Ohio

Application November 29, 1937, Serial No. 177,167

1 Claim. (Cl. 15—20)

My invention relates to road cleaning devices and more particularly to road cleaning devices adapted to be secured to tractors or the like.

One of the principal objects of my invention is to provide a road cleaning device adapted to be connected to a tractor or the like which is simple in construction, efficient in use, and easy of attachment.

Another object of my invention is to provide a device of the above described character wherein a nozzle is employed in advance of a tractor or the like and said nozzle being adjustable relative to the line of travel of said tractor and vertically thereof.

Other objects and advantages will be apparent from the following description, appended claim and annexed drawings.

Referring to the drawings wherein like reference characters designate like parts throughout the several views:

Fig. 1 is a side elevation of my invention illustrating the same attached to a typical form of tractor.

Fig. 2 is a top plan view thereof.

Fig. 3 is a sectional view taken on the line 3—3 of Figure 1.

Fig. 4 is a top plan view of the chassis.

Fig. 5 is a detail longitudinal sectional view of the nozzle.

In practicing my invention I employ a tractor 5 of typical construction equipped with a chassis 6 and power take-off shaft 7 having a pulley 8 rotatable therewith.

Secured to the chassis 6 on one side of the tractor is a frame 9, said frame comprising laterally extending arms 10 having right angularly disposed sections 11 secured to an angle iron 12 by means of bolts 13. The upper ends of said sections 11 are offset to engage the upper face of the angle iron 12. Secured to the outer ends of the angle iron 12 are a pair of braces 14 connected to the ends of the arms 10 and said arms 10 are connected together intermediate of the ends thereof by a pair of spaced rails 15, said rails fashioned with slots for receiving bolts and nuts 16 connecting the same to the arms 10 whereby said rails are adjustable relative to said arms.

Mounted on the rails 15 is a blower 17 of typical construction equipped with an outlet port 18 and drive shaft 19 on which is secured a pulley 20. Said pulley 20 being connected to the pulley 8 by means of a belt 21 whereby said blower is operated from the power take-off shaft 7. Connected to the outlet port 18 is a flexible conduit 22, the outer end of which is connected to an elongated nozzle 23. Said nozzle is adapted to discharge air forced through said conduit from said blower onto the surface of a road or the like to clean said surface of small particles of dirt and other foreign matter in advance of the travel of the tractor.

A pair of forwardly extending spaced arms 24 are mounted on the blower as at 25, the outer ends of said arms having mounted thereon a plurality of pulleys 26 over which are trained a quaternary of cables 27, 28, 29 and 30 respectively. A cross member 31 is fixed to a mud guard of the tractor adjacent the rear seat and has fixed thereto a plurality of cable securing elements or eye bolts through which are trained the rear ends of the cables 27, 28, 29 and 30 respectively. The cables are secured to said eye bolts by hitches or knots in said rear ends. The front ends of the cables 27 and 28 are connected to the front end of the nozzle 23 and by manually adjusting the hitches in the rear ends of said cables relative to the eye bolts, lateral adjustment of the nozzle is obtained. The front end of the cable 29 is formed with a pair of forwardly diverging end sections connected to the front of the nozzle 23 and by manually adjusting the hitch in the rear end of said cable relative to the eye bolt vertical adjustment of the nozzle is obtained. The front end of the cable 30 is connected to the conduit 22, adjacent the nozzle, whereby said conduit may be vertically adjusted upon manual adjustment of the hitch in the rear end of the cable 30 relative to the eye bolt thereof. Obviously, by adjusting the various cables in the foregoing described manner, the nozzle may be adjusted laterally and vertically of the line of travel of the tractor.

From the foregoing it will be apparent that my device, when attached to the side of a tractor, may be operated to effectively remove dirt and the like from the path of a tractor and laterally thereof.

What I claim is:

A device of the character described, comprising, a frame adapted to be mounted on a tractor, a member adapted to be secured to said tractor and provided with cable securing elements, air blast means on said frame, a nozzle arranged in advance and subjacent said means, a flexible conduit connecting said means to said nozzle, a pair of arms connected to said means and extending above said conduit, pulleys mounted on said arms, a quaternary of cables trained over said pulleys and having front and rear ends, said rear ends of said cables connected to said elements, the front ends of a pair of said cables connected to said nozzle whereby upon adjustment of their rear ends lateral adjustment of said nozzle is effected, the front end of another of said cables connected to said nozzle whereby adjustment of its rear end effects vertical adjustment of said nozzle, the front end of still another of said cables connected to said conduit whereby adjustment of its rear end effects vertical adjustment of said conduit thereby enabling said nozzle and conduit to be adjusted relative to a line of travel of said tractor.

CHARLES WISHER.